Sept. 1, 1970  R. V. DICKINSON  3,526,857
ACOUSTIC DELAY LINE EMPLOYING TORSIONAL WAVES AND
TRANSDUCER FOR THE SAME
Filed Aug. 21, 1968
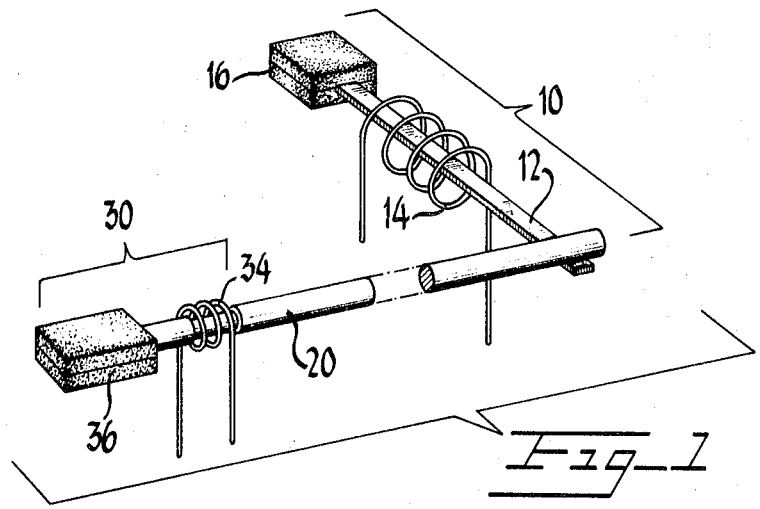
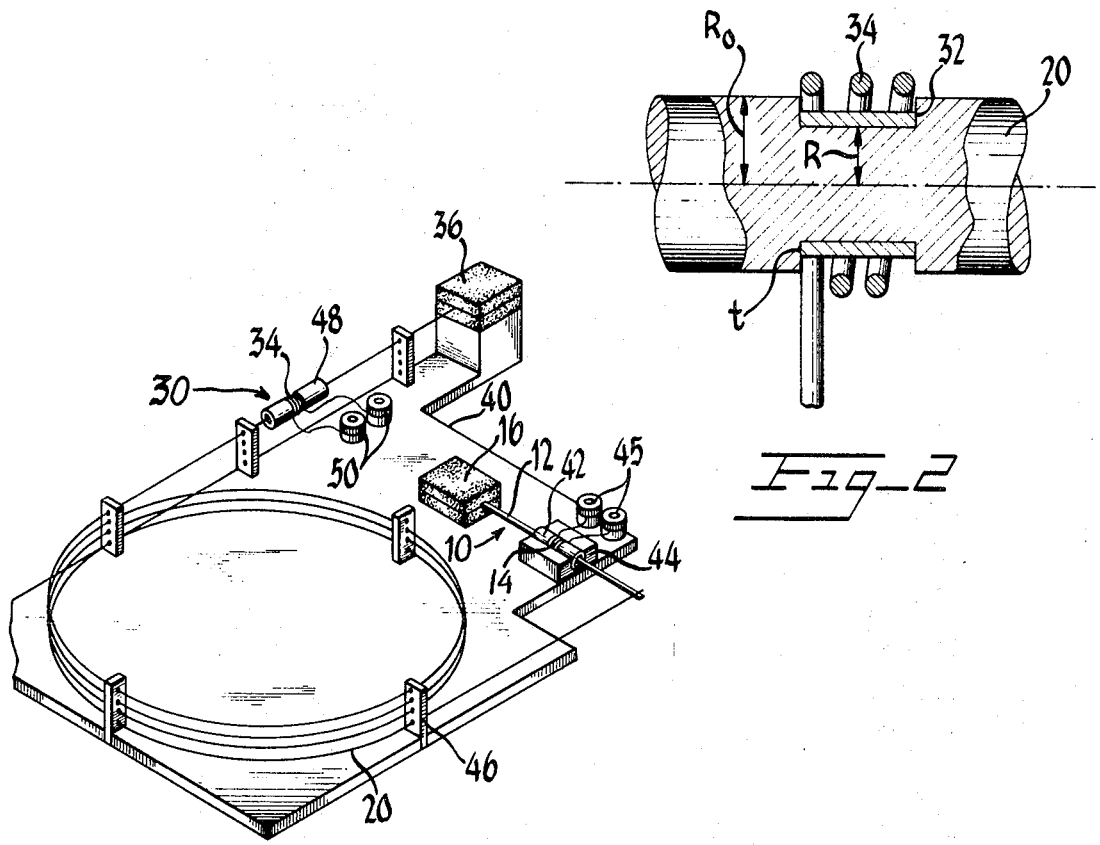
INVENTOR.
Robert V. Dickinson
BY
Charles R. Lepchinsky
ATTORNEY

United States Patent Office 3,526,857
Patented Sept. 1, 1970

3,526,857
ACOUSTIC DELAY LINE EMPLOYING TORSIONAL WAVES AND TRANSDUCER FOR THE SAME
Robert V. Dickinson, San Carlos, Calif., assignor to The Singer Company, a corporation of New Jersey
Filed Aug. 21, 1968, Ser. No. 756,731
Int. Cl. H03h 9/30; H04r 15/00
U.S. Cl. 333—30                                   13 Claims

ABSTRACT OF THE DISCLOSURE

An acoustic delay line employing torsional waves is disclosed which has an input transducer comprising a single magnetostrictive tape coupled to a transmission line and an output transducer for detecting torsional waves comprising a magnetostrictive layer deposited on the surface of the transmission line and a coil disposed about the layer. The transmission line and transducers are acoustically matched to prevent reflections of propagated torsional waves at their boundary.

BACKGROUND OF THE INVENTION

This invention relates to acoustic delay lines which have found wide use as digital memories in business machines, for example, electronic calculators and small programmable computers, radar tracking systems, various data handling systems, etc. A typical delay line of this type has three basic elements—an input transducer, a transmission element, and an output transducer. An electrical signal which is to be delayed, such as a pulse, is presented to the input transducer which converts the electrical signal to an acoustical signal at one end of the transmission element. The acoustical signal propagates along the transmission element, which is usually a rod or wire, at a known speed until it reaches the output transducer. The output transducer then converts the acoustical signal back into an electrical signal which can be applied to other circuitry, such as a counting apparatus, or recirculated through the transmission element if continued storage is required.

In a rod transmission element, an acoustical signal may be propagated in three modes: as a compressional wave, a flexural wave, and a torsional wave. The use of a compressional wave mode of propagation in acoustic delay lines is limited by two major factors: the relatively high velocity of such waves and dispersion effects which act to spread out an initially well-defined wave, such as a square wave. Flexural waves exhibit a wide range of velocities and dispersion effects. Torsional waves, on the other hand, travel at a much lower rate and their velocity is independent of frequency. Thus, when torsional waves are employed in a delay line, the length of transmission element required to produce the same time delay is substantially shorter than that required when compressional waves are used. Further, due to the absence of dispersive effects, a pulse which is composed of several frequencies—for example, a square wave—will propagate in a torsional mode without being grossly distorted, thus enabling its prescise detection. Moreover, a series of pulses applied to the transmission line in a torsional mode can be more closely spaced than in the compressional or flexural mode without fear of their being unrecognizably merged at the output end of the line.

The types of waves propagated in the line depend on the type of input transducer used. U.S. Pat. No. 2,837,721 to R. Millership discloses an input transducer suitable for generating compressional acoustic waves in a transmission element in response to an electrical signal which generally comprises a coil surrounding a magnetostrictive portion of the wire. The magnetostrictive portion of the wire may be a cylindrical element joined to the wire, or a plating on the surface of the wire, or the entire wire may be made of a magnetostrictive material. When a current is passed through the coil, the length of the magnetostrictive portion affected by the coil field changes abruptly, resulting in a compressional wave which travels along the wire. An input transducer used for generating torsional acoustic waves in a transmission element is shown in U.S. Pat. 3,011,136 to G. G. Scarrott. A transducer of this type uses a pair of magnetostrictive tapes, each of which has one end attached tangentially to the wire transmission element at the input end. A coil is wound coaxially about a portion of each tape. When a current is passed through the coils, the length of a portion of each tape changes abruptly, which rotatively twists the end of the wire, thereby producing a torsional wave which travels along the wire. A similar type of transducer disclosed by R. W. George et al. in U.S. Pat. No. 2,810,888 employs a single tape to produce torsional waves in a wire. These types of transducers have been heretofore employed in matched input-output pairs. Both types of transducers, however, produce at the input end undesirable flexural waves of relatively large amplitude in the wire along with the torsional waves. Since the velocity of flexural waves is a function of frequency, these waves travel at speeds both above and below the speed of the torsional waves. Thus, a single electric input pulse results in several waves traveling in the wire which do not all arrive at the output transducer simultaneously. Since the output transducer is sensitive to both the torsional and flexural waves, several output signals are provided for each single input pulse. This masks the information desired to be delayed. Efforts in the prior art directed to solving this problem have resulted in costly and unsatisfactory arrangements. Among such efforts have been aligning both coaxially-wound tape coils equidistant from the longitudinal axis of the transmission element, constructing the transmission element with special resonator sections, equalizing the currents through the individual tape coils by means of sophisticated electronic circuitry, and other costly and intricate procedures.

Attempts have also been made to construct input transducers which produce only torsional waves in the wire by plating a magnetostrictive substance, such as nickel, on a section of the wire itself, magnetically orienting the substance about its circumference, and surrounding the plated wire with a coil. Prior art transducers of this type do produce torsional waves, but they are of such low amplitude that they cannot be readily detected further along the wire. In addition, in order to obtain significant frequency response, such transducers must be very short and impedance matched at each end. This requires a costly and intricate fabrication procedure.

SUMMARY OF THE INVENTION

The applicant's invention provides a simple, expedient, and inexpensive solution to the above problems found in the prior art by combining a single tape input transducer, a transmission element, and a simple output transducer which is only responsive to torsional waves propagated along the transmission element. Since the output transducer is unaffected by flexural and compressional waves, the relatively simple single tape transducer can be used to generate acoustic waves in the transmission element without loss in performance. The output transducer is constructed by depositing a magnetostrictive material on the surface of the transmission element at the output end thereof, magnetizing the material in a circumferential direction, and placing a pick-up coil about the now-magnetized material. In another aspect of the invention, the output transducer is acoustically matched to the transmission element. In a preferred embodiment of the invention, this acoustic matching is achieved by dimensioning the thickness of the material in accordance with the radius of the transmission element, the densities of the element material and magnetostrictive material, the velocity of torsional waves in said materials, and the radius of the reduced portion of said element.

For a fuller understanding of the nature and advantages of the invention, reference should be had to the following detailed description, taken in conjunction with the accompanying drawings wherein like reference characters designate like or similar elements throughout the various views and in which:

FIG. 1 is a perspective view of a preferred embodiment of the invention;

FIG. 2 is a view partially in section of the transmission element and output transducer of the preferred embodiment of FIG. 1; and FIG. 3 is a view of another embodiment of the invention with a helical transmission element.

FIG. 1 shows a specific embodiment of the invention which comprises input transducer assembly 10, wire transmission element 20—hereinafter labeled wire 20 for brevity—and output transducer assembly 30. Input transducer assembly 10 comprises tape 12 which may be formed from any suitable magnetostrictive substance, for example, nickel, iron, cobalt, and alloys thereof, transducer coil 14 which surrounds tape 12, and damping pad 16. One end of tape 12 is joined to the input end of wire 20 by welding, preferably at substantially a right angle. The other end of tape 12 is securely held by damping pad 16. If desired, a permanent magnet (not shown) may be associated with tape 12 to provide a magnetic bias for the tape. Otherwise, the remanent magnetization of the tape provides the bias. Wire 20 may be made of any appropriate substance which will propagate torsional waves. To obtain the maximum bit rate for a given delay and in cases where excessive attenuation or damping of the propagated waves is a critical factor, the wire may be made of a substance such as beryllium copper, Phosphor bronze, or aluminum, which effects a relatively small amount of damping or attenuation of the propagated waves. Such a wire is defined as one with a low acoustic loss characteristic.

Output transducer assembly 30 comprises annular cylindrical element 32, shown in FIG. 2, transducer coil 34 which surrounds element 32, and damping pad 36. Damping pads 16 and 36 may be made of any suitable substance, such as silicone rubber, or RTV. Cylindrical element 32 can be formed of any suitable magnetostrictive substance, such as nickel, iron, cobalt, and alloys thereof. In one method of assembly, nickel is plated on the surface of wire 20 to form the annular element 32. While the circumferential magnetization of the annular element can be produced in any suitable way, in a preferred embodiment the element is permanently magnetized during the heat treatment of the assembly. During this treatment, the assembly is heated to the annealing temperature of nickel, 1,078° F., which is above its Curie point, 690.8° F., held for a short time, and then allowed to cool through its Curie point to room temperature. During the annealing and the cooling processes, a current is passed through the wire to produce a circular magnetic field in the annular nickel element, which field is normal to the longitudinal axis of the element and wire. With beryllium copper wire having a radius of .006 inch, a current of one ampere will produce a field of about sixteen oersteds in the element. This is well above the coercive force of nickel at room temperature. The resulting residual magnetism of the nickel annular element is thus in a circumferential direction which is everywhere normal to the longitudinal axis of the element. Coil 34 is then installed about the assembly, so as not to contact the annular element, and the end of wire 20 is secured by damping pad 36.

In operation, when a current pulse is applied to input coil 14, the magnetic field produced within the coil produces longitudinal stress waves in tape 12 due to the magnetostrictive property of the tape material. One wave travels away from wire 20 and is absorbed by damping pad 16. Another travels to the wire 20 and upon reaching it, a portion of the wave energy is reflected back and the other portion produces torsional, compressional, and flexural waves in the wire. The back-reflected wave is absorbed by pad 16. The waves in the wire 20 propagate therealong at different velocities. Upon reaching output transducer 30, the torsional wave produces a corresponding output pulse current in coil 34. Because of the circumferential magnetization of the annular magnetostrictive element, the output transducer is insensitive to the compressional and flexural waves. Consequently, they produce no output in coil 34. Upon reaching the end of wire 20, all waves are absorbed by damping pad 36.

To prevent reflection of the torsional waves at the boundary between the wire 20 and the output transducer and to minimize energy losses, it is desirable to match the acoustical impedance of the two. This can be achieved in any number of ways. In a preferred embodiment, matching is accomplished by a proper dimensioning of the annular element in the following manner.

The impedance of the wire is $$Z_0 = \int_0^{R_0} \rho_0 c_0 r^2 2\pi r\, dr = \frac{\pi}{2} \rho_0 c_0 R_0^4$$

for a wire of uniform density $\rho_0$ having a torsional wave propagation velocity $c_0$ and radius $R_0$. The impedance of the output transducer section is $$Z = \frac{\pi}{2} \rho_0 c_0 R^4 + \int_R^{R+t} 2\pi \rho c r^3\, dr$$

$$= \frac{\pi}{2} \{\rho_0 c_0 R^4 + \rho c[(R+t)^4 - R^4]\}$$

$$= \frac{\pi}{2} \rho c (R+t)^4 + \frac{\pi}{2}(\rho_0 c_0 - \rho c) R^4$$

where $\rho$ is the density and $c$ is the torsional wave propagation velocity of the magnetostrictive annular element material, R is the reduced radius of the wire, and $t$ is the thickness of the annular element. For matching, the two impedances must be equal:

$$Z = Z_0$$
$$\rho c(R+t)^4 + (\rho_0 c_0 - \rho c)R^4 = \rho_0 c_0 R_0^4$$
$$t = \left[\frac{\rho_0 c_0 R_0^4 + (\rho c - \rho_0 c_0)R^4}{\rho c}\right]^{1/4} - R$$

This states the conditions imposed on the wire-transducer system for impedance matching to obtain. In actual practice, starting with a wire of known radius, density, and torsional wave propagation velocity, and a magnetostrictive material of known density and torsional wave propagation velocity, a portion of the surface of the wire is reduced to a suitable radius which determines the thickness $t$ of the annular magnetostrictive element to be deposited on this reduced surface. In the specific embodiment of the invention of FIGS. 1 and 2, beryllium copper wire having a radius of .006 inch was chosen. Beryllium copper has a density of 8.2 g./cc. and a torsional wave propagation velocity of 2,500 meters per second. A portion of the surface at the output end was reduced to a radius of .005 inch by etching with phosphoric acid, $H_3PO_4$. Nickel, which has a density of 8.9 g./cc. and a torsional wave propagation velocity of 3,000 meters per second, was chosen for the annular element material. By simple calculations, the required thickness $t$ was found to be .0008 inch.

To maximize the energy transmitted at the tape-wire junction and to minimize the energy reflected, it is also desirable to match the acoustic impedances of the single tape and the wire at the input end. By equating the impedance of the wire and the single tape, the matching conditions are found to be:

$$A = \frac{\pi}{2} \frac{\rho_0 c_0}{\rho_1 c_1} R_0^2$$

where A is the cross-sectional area, $\rho_1$ the density, and $c_1$ the compressional wave propagation velocity of the tape; and $\rho_0$ is the density, $c_0$ the torsional wave propagation velocity, and $R_0$ the radius of the wire. Thus, starting with a wire of known radius, density, and torsional wave propagation velocity, and a magnetostrictive tape material of known density and longitudinal wave propagation velocity, the required cross-sectional area of the tape is predetermined according to the above relation. As an example, using the same materials as were employed for the input transducer-wire assembly, with the same radius $R_0$ of .006 inch, the required cross-sectional area is .00004 square inch.

In the embodiment shown in FIG. 3, input transducer assembly 10, wire 20, and output transducer assembly 30 are shown mounted on mounting board 40, which may comprise nylon or some other suitable material. Input transducer tape 12 is fixed at one end to damping pad 16 and at the other end to wire 20. Transducer coil 14 is wound about bobbin 42 which is mounted in mounting block 44. Terminals 45 provide the electrical connection between an input signal and coil 14. Wire 20 is wound in helical form and held in place by support members 46, which are attached to base 40. The electrical leads from output coil 34, which are wound about bobbin 48, are connected to terminal posts 50, to which suitable output connections may be made to utilization circuits. The output end of wire 20 is secured by damping pad 36. The mode of operation is essentially the same as the above-described operation of the embodiment of FIGS. 1 and 2. This arrangement provides a particularly compact delay line assembly with a relatively long time delay.

It is to be understood that numerous other arrangements and modifications, as well as other applications, may be devised by one skilled in the art without departing from the spirit and scope of this invention.

What is claimed is:

1. An acoustic delay line comprising:
   means for transmitting torsional waves;
   first means coupled to said transmitting means for generating torsional waves in response to an input signal, said first means including a coil for receiving electrical input signals and a single elongated member positioned adjacent said coil and having a magnetostrictive portion, said member being coupled to the outer surface of said transmitting means for rotating said transmitting means to produce torsional waves; and
   second means for converting torsional waves into an output signal, said second means including a circumferentially magnetized magnetostrictive layer deposited on the surface of said transmitting means in spaced relation to said first means and a coil disposed about and magnetically linked to said magnetostrictive layer.

2. The delay line according to claim 1 wherein the longitudinal axis of said single elongated member is substantially normal to the longitudinal axis of said transmitting means.

3. The delay line according to claim 1 wherein said transmitting means comprises a wire with a low acoustic loss characteristic.

4. The delay line according to claim 1 wherein the acoustic impedances of said converting means and said transmitting means are matched to minimize reflections of said torsional waves at the boundary therebetween.

5. The delay line according to claim 1 wherein said magnetostrictive layer comprises an annulus deposited in a cylindrical groove on the surface of the transmitting means.

6. The delay line according to claim 5 wherein the end walls of said annulus are substantially normal to the longitudinal axis of said transmitting means.

7. The delay line according to claim 1 wherein said transmitting means comprises a cylindrical element having a radius $R_0$ and a reduced portion of radius R forming a groove having a depth $a$, and said magnetostrictive layer comprises an annulus with thickness $t$ and an inner diameter substantially equal to 2R coupled to the surface of said groove, said cylindrical element and said annulus having dimensions related in accordance with the formula $$t = \left[ \frac{\rho_0 c_0 R_0^4 + (\rho c - \rho_0 c_0) R^4}{\rho c} \right]^{1/4} - R$$

wherein $\rho_0$ and $\rho$ are the respective densities of the cylindrical element and annulus materials and $c_0$ and $c$ are the respective velocities of torsional waves in said cylindrical element and said annulus materials, whereby said transmitting means and said converting means are acoustically matched to prevent reflections at the boundary therebetween.

8. An acoustic delay line-transducer assembly having matched acoustic impedances comprising a wire adapted to propagate torsional waves having a substantially uniform radius $R_0$ and a portion of reduced radius R which forms a cylindrical groove of depth $a$, and
   a transducer which comprises a circumferentially magnetized magnetostrictive annular element coupled to the surface of said reduced portion and forming an acoustic match with said wire, and a coil disposed about said annular element.

9. The delay line-transducer assembly according to claim 8 wherein said magnetostrictive annular element is permanently magnetized.

10. The delay line-transducer assembly according to claim 8 wherein said wire has a low acoustic loss characteristic.

11. The delay line-transducer assembly according to claim 8 wherein the dimensions of said wire and annular element are related in accordance with the formula $$t = \left[ \frac{\rho_0 c_0 R_0^4 + (\rho c - \rho_0 c_0) R^4}{\rho c} \right]^{1/4} - R$$

wherein $t$ is the thickness of said annular element $\rho_0$ and $\rho$ are the respective densities of said wire and annular element materials, and $c_0$ and $c$ are the respective velocities of torsional waves in said wire and said annular element materials.

12. The delay line-transducer assembly according to claim 11 wherein said thickness $t$ of said annular element is less than said depth $a$ of said cylindrical groove.

13. The delay line-transducer assembly according to claim 11 wherein the ends of said annular element are substantially normal to the longitudinal axis of said wire.

References Cited

UNITED STATES PATENTS 3,460,243    8/1969    Riley _____ 333—30 X

PAUL L. GENSLER, Primary Examiner

U.S. Cl. X.R.

333—33